(12) United States Patent
Kitscha

(10) Patent No.: US 7,959,123 B1
(45) Date of Patent: Jun. 14, 2011

(54) OBJECT SUPPORT

(76) Inventor: John J. Kitscha, Brookfield, WI (US)

( * ) Notice: Subject to any disclaimer, the term of this patent is extended or adjusted under 35 U.S.C. 154(b) by 302 days.

(21) Appl. No.: 12/344,730

(22) Filed: Dec. 29, 2008

(51) Int. Cl.
*F16M 11/32* (2006.01)

(52) U.S. Cl. .................. 248/440.1; 248/168; 248/177.1; 248/188

(58) Field of Classification Search .................. 248/168, 248/169, 170–171, 177.1, 187.1, 181.1, 181.2, 248/15.8, 166, 440.1, 188, 188.2, 188.4, 248/188.5, 188.6; 42/94
See application file for complete search history.

(56) References Cited

U.S. PATENT DOCUMENTS

| 821,335 | A | * | 5/1906 | Butler | 248/168 |
|---|---|---|---|---|---|
| 3,921,947 | A | * | 11/1975 | Adam | 248/169 |
| 4,317,552 | A | * | 3/1982 | Weidler | 248/168 |
| 4,351,224 | A | * | 9/1982 | Curtis | 89/37.04 |
| 4,625,620 | A | * | 12/1986 | Harris | 89/37.04 |
| 4,635,620 | A | * | 1/1987 | Ricchio | 601/148 |
| 5,630,660 | A | | 5/1997 | Chen | |
| 6,902,294 | B2 | | 6/2005 | Wright | |
| 7,137,655 | B2 | * | 11/2006 | Quarberg | 292/339 |
| 7,281,693 | B2 | * | 10/2007 | Chou | 248/181.1 |
| 7,571,563 | B2 | * | 8/2009 | Peterson | 42/94 |
| 2006/0086871 | A1 | * | 4/2006 | Joseph et al. | 248/178.1 |

* cited by examiner

*Primary Examiner* — Tan Le
(74) *Attorney, Agent, or Firm* — Donald J. Ersler

(57) ABSTRACT

An object support includes a support base and at least two legs. The support base includes at least two leg yokes and an insert boss. Each leg includes a retention projection and at least one tubular leg section. A fastener or the like is inserted through the retention projection and the leg yoke to retain the leg relative to the support base. A set-screw or the like is threaded through a top of the support base to limit the angular travel of the tubular leg relative to the support base. A spring loaded retention pin is retained in the insert boss. An object support insert includes an object insert pin and an accessory retention device. A ball detent preferably extends radially from an end of the object insert pin. A retention groove is formed in a perimeter of the object insert pin for engagement with the retention pin.

3 Claims, 6 Drawing Sheets

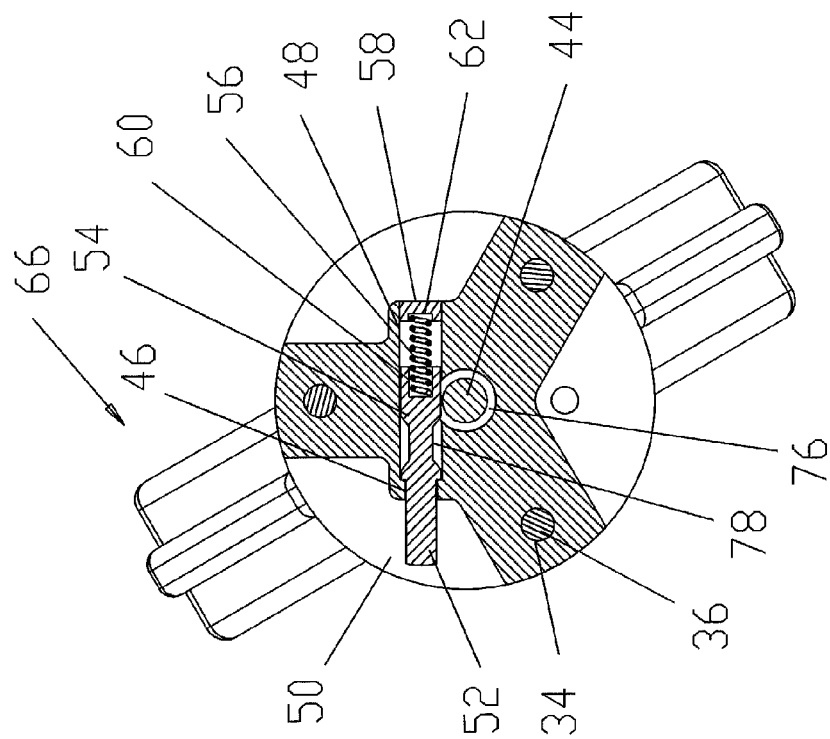
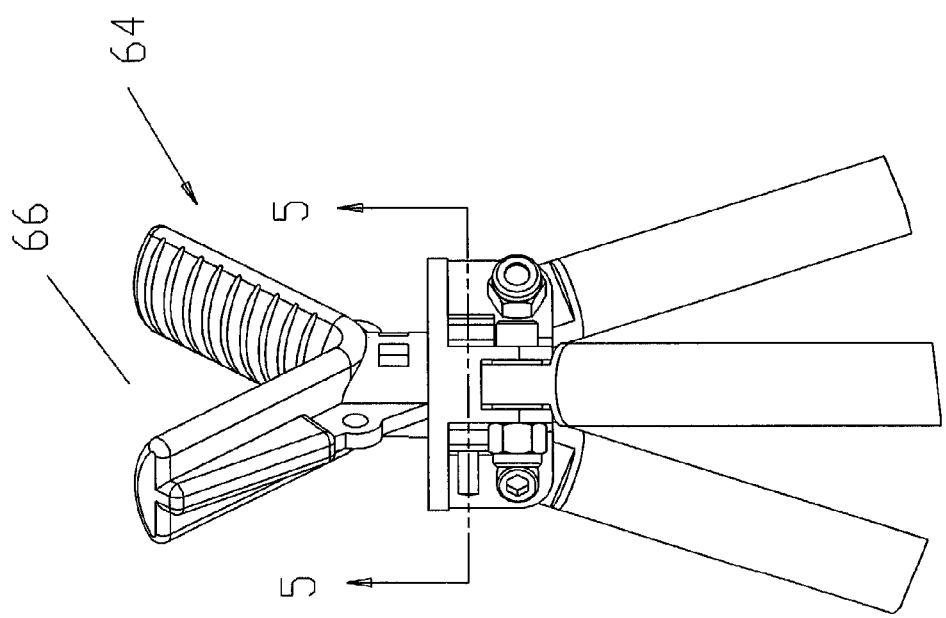
FIG. 5
FIG. 4

OBJECT SUPPORT

BACKGROUND OF THE INVENTION

1. Field of the Invention

The present invention relates generally to support devices and more specifically to an object support, which provides support to an object resting on the object support.

2. Discussion of the Prior Art

U.S. Pat. No. 3,921,947 to Adam discloses an adjustable tripod. The Adam patent includes a tripod having a body member and at least three legs pivoted thereto. Each leg has a cam member which co-operates with a centrally-disposed, vertically-movable common cam mounted above the body member to determine the maximum straddle of the legs and thus the height of the tripod. U.S. Pat. No. 5,630,660 to Chen discloses a warning light. The Chen patent includes a warning light with a base to which an elongated post formed by a plurality of telescopic tubular segments is fixed. A plurality of legs extend through holes formed in the base. U.S. Pat. No. 6,902,294 to Wright discloses a light stand. The Wright patent includes a tripod for supporting photographic lighting accessories. An accessory-mounting fixture for receiving a photographic lighting accessory, camera, or other device is disposed at the top of the light stand.

Accordingly, there is a clearly felt need in the art for an object support, which provides support to an object resting on a top of the object support; allows the object to be quickly removed and installed; and allows an angular orientation of the legs to be adjusted.

SUMMARY OF THE INVENTION

The present invention provides an object support, which provides support to an object resting on a top of the object support. The object support includes a support base and at least two legs. The support base includes at least two leg yokes and an insert boss. Each leg includes a retention projection and at least one tubular leg section. The retention projection is retained in one end of a first tubular leg section. A second tubular leg section may be retained in the other end of the first tubular leg section. A leg cross hole is formed through the retention projection and a yoke cross hole is formed through each leg yoke. A fastener or the like is inserted through the leg and yoke cross holes to retain the leg relative to the support base.

A tapped hole is formed through a top of the support base in a middle of the leg yoke. The tapped hole is sized to threadably receive a threaded fastener, such as a set-screw. The set-screw is used to limit the angular travel of the tubular leg relative to the support base. A pin bore is formed through the insert boss to receive an object insert pin. A spring pin hole is formed through the support base, substantially perpendicular to the pin bore. The spring pin hole is enlarged with a spring bore. A retention pin is retained in the spring bore with a compression spring and a threaded plug.

An object support insert includes the object insert pin and an accessory retention device, such as a V-bracket. A ball detent may extend radially from the object insert pin. The ball detent is positioned on a length of the object insert pin, such that an end of the ball contacts a bottom of the pin boss. A curved groove is formed in a perimeter of the object insert pin. The curved groove is positioned to receive the retention pin, such that the accessory retention device may be rotated relative to the support base. It is intended that a minimum of play exists between a top of the support base and a bottom of the accessory retention device. The retention pin retains the object support insert in the support base to prevent the object support insert from falling out of the support base, if the object support is carried up side down.

Accordingly, it is an object of the present invention to provide an object support, which provides support to an object resting on a top of the object support.

It is a further object of the present invention to provide an object support, which allows the object to be quickly removed and installed.

It is yet a further object of the present invention to provide an object support, which includes at least one locking mechanism to lock the object being supported to a support base.

Finally, it is another object of the present invention to provide an object support, which allows an angular orientation of the legs to be adjusted.

These and additional objects, advantages, features and benefits of the present invention will become apparent from the following specification.

BRIEF DESCRIPTION OF THE DRAWINGS

FIG. 4 is a perspective view of an object support insert retained by an object support in accordance with the present invention.

FIG. 5 is a cross sectional view cut through an object support of FIG. 3 in accordance with the present invention.

DETAILED DESCRIPTION OF THE PREFERRED EMBODIMENTS

Figure 1:
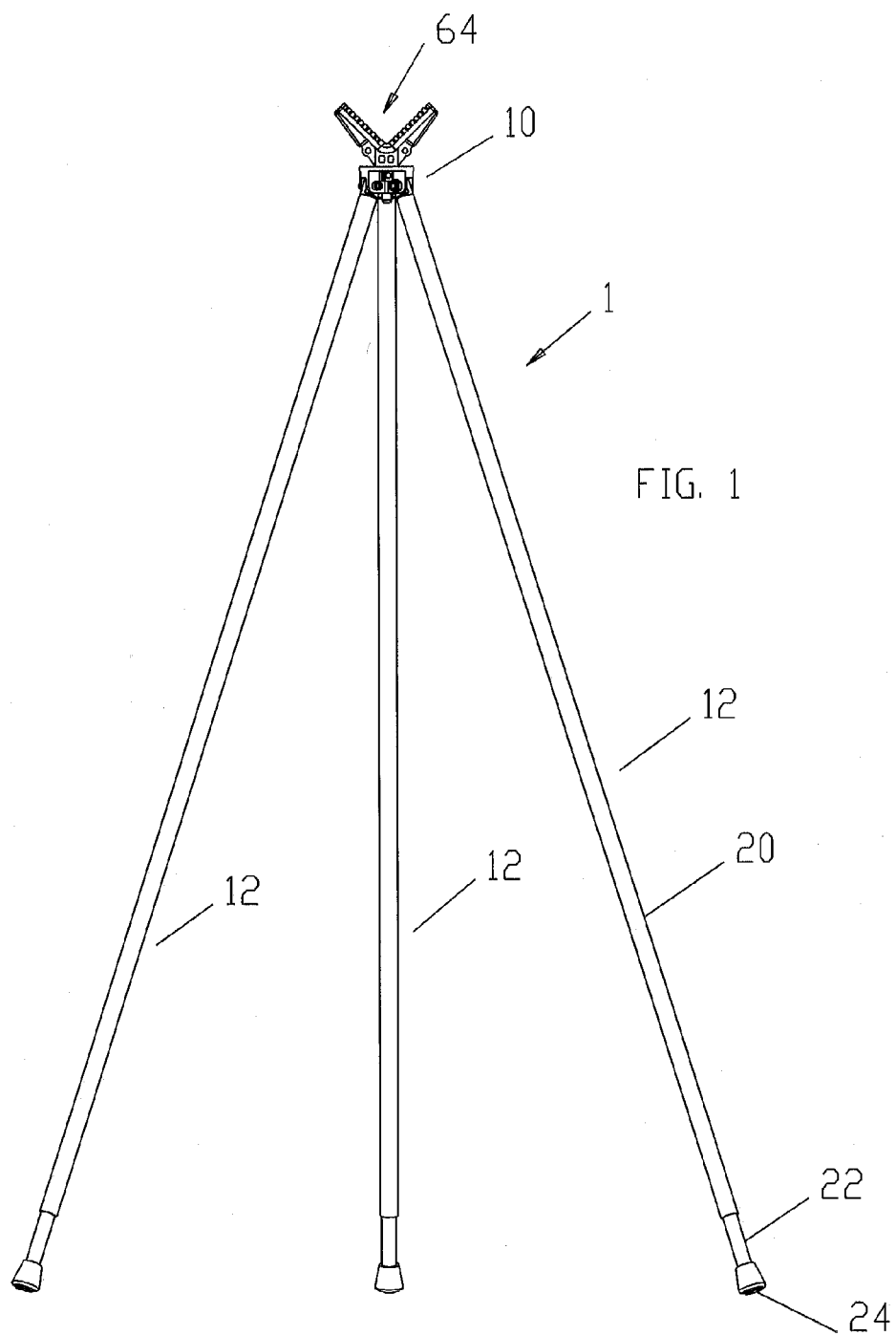
FIG. 1 is a front view of an object support retaining an object support insert in accordance with the present invention.
Figure 2:
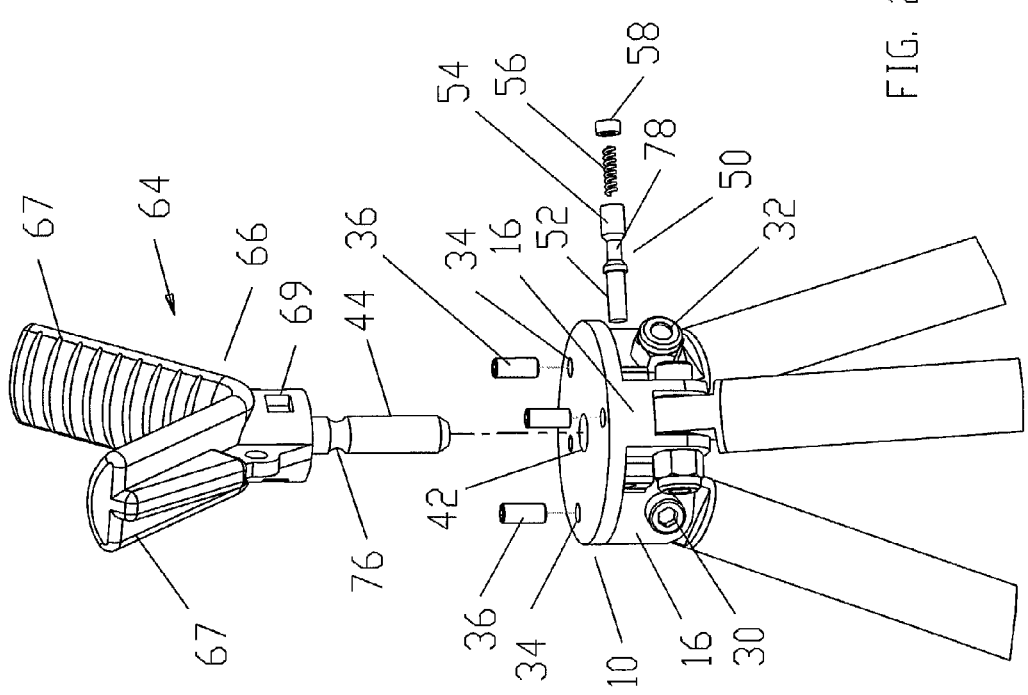
FIG. 2 is a partially exploded perspective view of an object support and an object support insert in accordance with the present invention.
Figure 3:
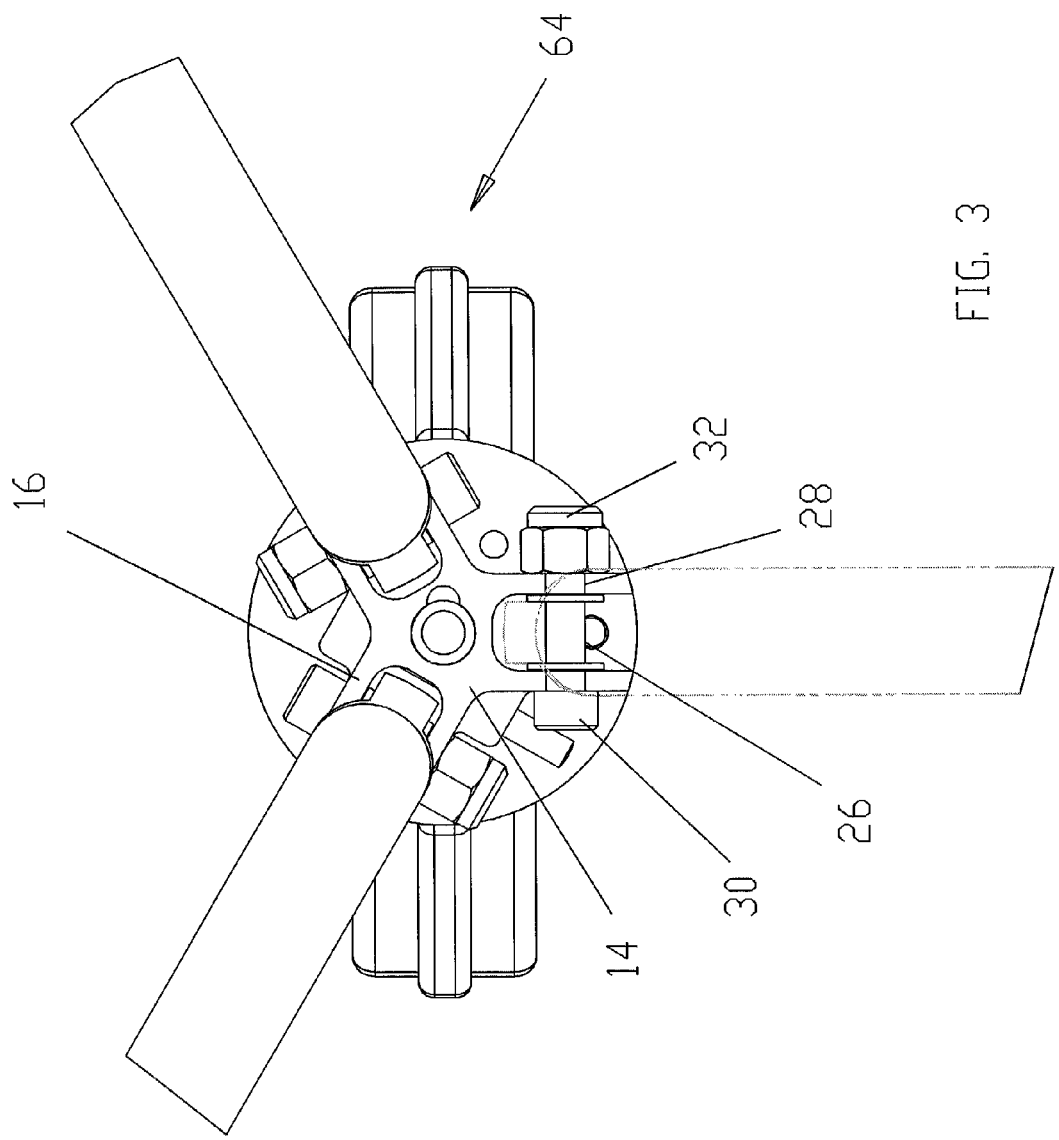
FIG. 3 is a bottom view of a support base of an object support in accordance with the present invention.
Figure 8:
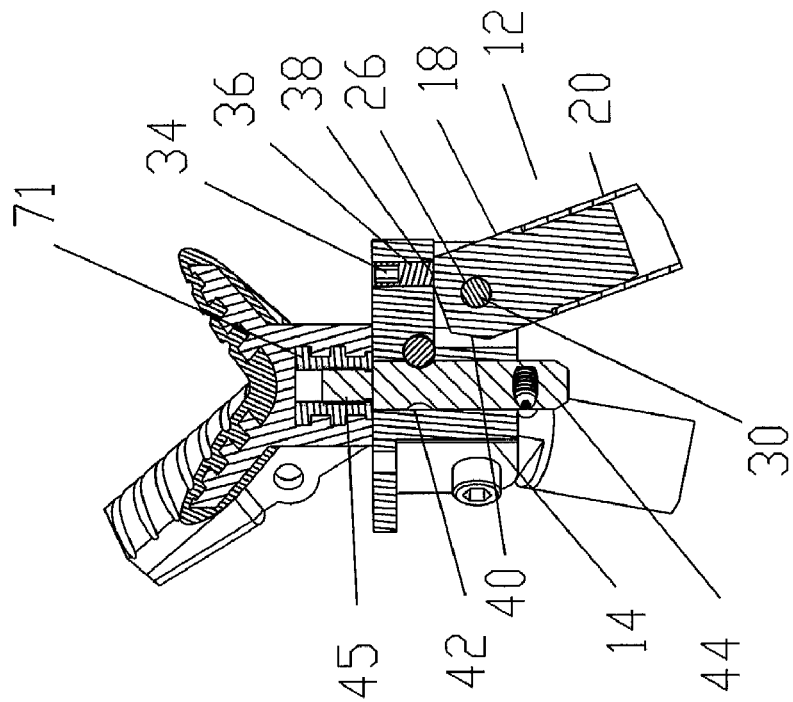
FIG. 8 is a cross sectional view cut through a width of an object support insert of an object support in FIG. 6 in accordance with the present invention.
Figure 6:
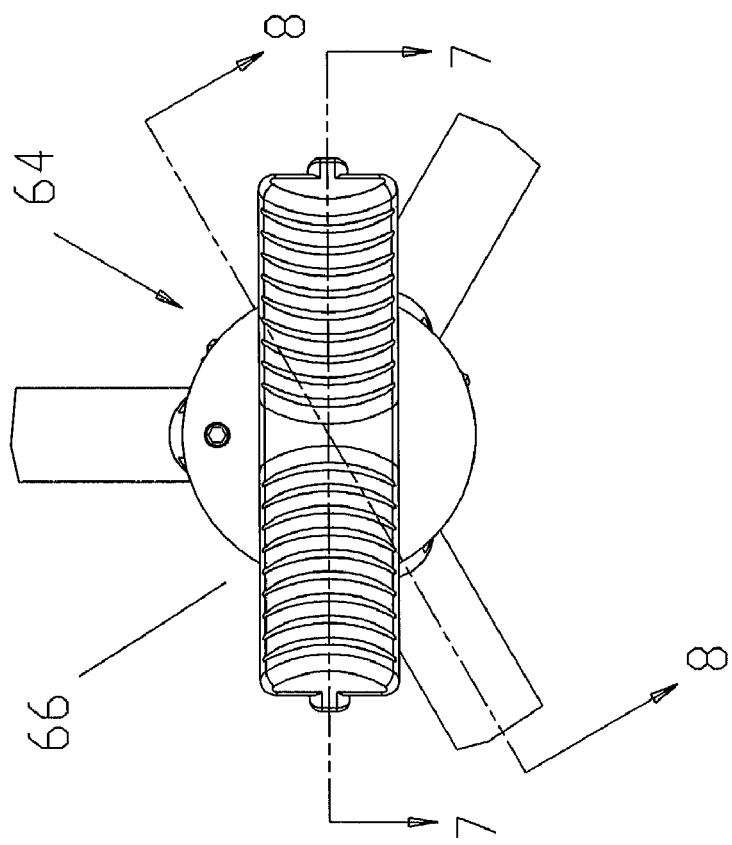
FIG. 6 is a top view of an object support insert and an object support in accordance with the present invention.
Figure 7:
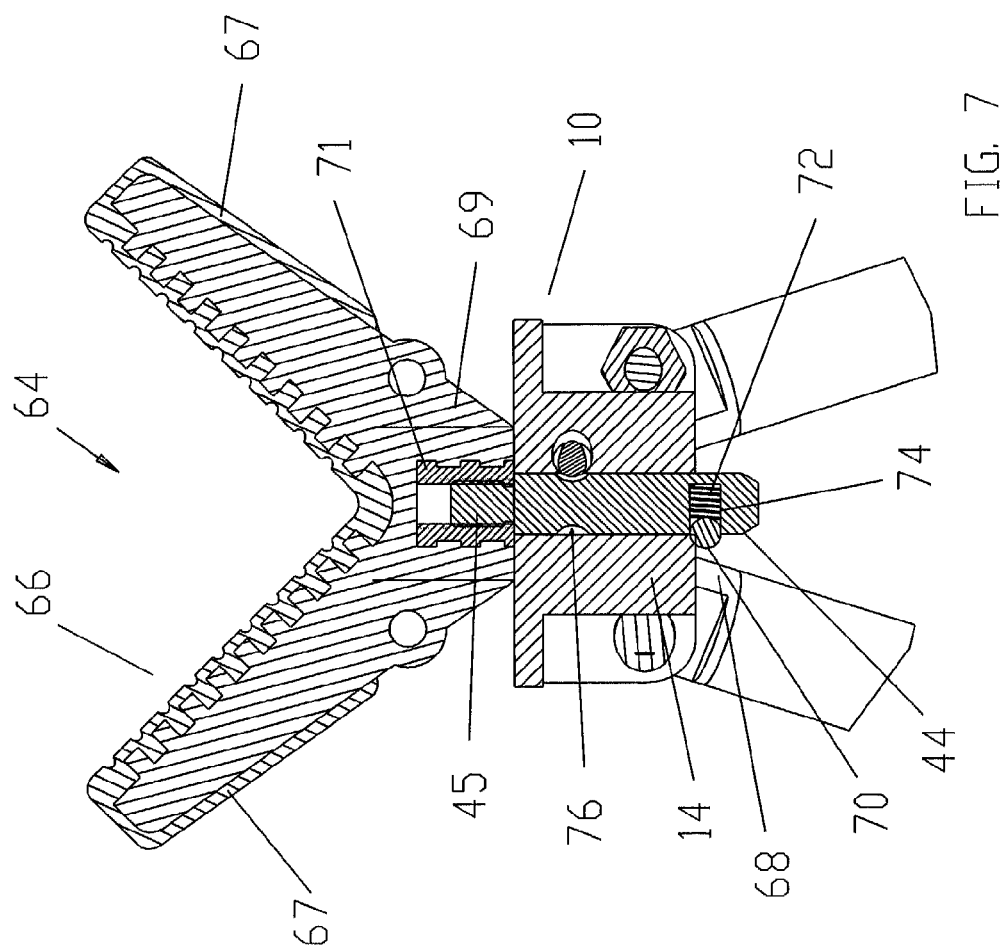
FIG. 7 is a cross sectional view cut through a length of an object support insert of an object support in FIG. 6 in accordance with the present invention.

With reference now to the drawings, and particularly to FIG. 1, there is shown a front view of an object support 1. With reference to FIGS. 2-3, the object support includes a support base 10 and at least two legs 12. The support base includes an insert boss 14 and at least two leg yokes 16. The at least two yokes 16 radially extend from the insert boss 14. With reference to FIGS. 6-8, each leg 12 includes a retention projection 18 and at least one tubular leg section. The retention projection 18 is preferably pressed into an end of a first tubular leg section 20. A second tubular leg section 22 may be retained in the other end of the first tubular leg section 20. The other end of the second tubular leg section 22 is preferably terminated with a foot 24. Each leg 12 may include more than two tubular (telescoping) leg sections.

A leg cross hole 26 is formed through the retention projection 18 and a yoke cross hole 28 is formed through each leg yoke 16. A threaded fastener 30 or the like is inserted through the leg and yoke cross holes to retain the leg 12 relative to the support base 10. The threaded fastener 30 is preferably retained in the leg and yoke cross holes with a threaded nut 32. A tapped hole 34 is formed through a top of the support base 10 in a middle of the leg yoke 16. The tapped hole 34 is sized to threadably receive a threaded fastener, such as a set-screw 36. The set-screw 36 is used to limit the angular travel of the tubular leg relative to the support base. A first angled surface 38 is formed on one top end of the retention projection 18, which is less than 45 degrees. A second angled surface 40 is formed on the other top end of the retention projection 18, which is greater than 45 degrees. The first and second angled surfaces allow a spread of the at least two legs to be varied.

A pin bore 42 is formed through the insert boss to receive an object insert pin 44. With reference to FIGS. 4-5, a spring pin hole 46 is formed through the insert boss 14 substantially perpendicular to the pin bore 42. The spring pin hole 46 is enlarged with a spring bore 48. A retention pin 50 preferably includes a first pin portion 52 and a second pin portion 54. The first pin portion 52 is sized to be slidably received by the spring pin hole 46 and the second pin portion 54 is sized to be slidably received by the spring bore 48. The retention pin 50 is retained in the spring bore 48 with a compression spring 56 and a spring retention threaded plug 58. The threaded plug 58 is threaded into an end of the spring bore 48. A pin spring pocket 60 is preferably formed in an end of the second pin portion 54 to radially retain one end of the compression spring 56. A plug spring pocket 62 is preferably formed in the threaded plug 58 to radially retain the other end of the compression spring 56.

An object support insert 64 includes the object insert pin 44 and an accessory retention device. The accessory retention device may be a V-bracket 66, a camera holder, a flashlight holder, a pan head mount or any other suitable accessory retention device. The V-bracket 66 includes two support arms 67 extending from an accessory base 69. A threaded insert 71 is preferably molded into the accessory base 69. A threaded end 45 of the object insert pin is threaded into the threaded insert 71. A ball detent 68 includes a ball 70 and a compression spring 72. A detent bore 74 is formed in the object insert pin 44 and positioned on a length of the object insert pin 44, such that an end of the ball 70 contacts a bottom of the pin boss 14. The compression spring 72 is inserted into the detent bore 74 and then the ball 70 is inserted into the detent bore 74. An end of the detent bore 74 is swaged to retain the ball 70 in an end of the detent bore 74.

A retention groove 76 is formed in a perimeter of the object insert pin 44 to receive the second portion 54 of the retention pin 50, such that the object support insert 64 (accessory retention device) may be rotated relative to the support base 10. It is intended that a minimum of play exist between a top of the support base 10 and a bottom of the accessory base 69 of the object support insert 64 (accessory retention device). A release groove 78 is formed in the second pin portion 54 to allow the object insert pin 44 to be released from or inserted into the support base 10, when the first pin portion 52 is pushed into the spring bore 48. The retention pin 50 retains the object support insert 64 in the support base 10 to prevent the object support insert 64 from falling out-of the support base 10, if the object support 1 is carried up-side down.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An object support and an object support insert comprising:
    a support base having a pin bore formed therethrough;
    at least two legs being pivotally retained by said support base, a top surface of each one of said at least two legs includes an angled surface;
    a threaded fastener being threadably retained in said support base above each one of said at least two legs, said threaded fastener contacts said angled surface of each one of said at least two legs, rotation of said threaded fastener changing the rotational angle limit of each one of said at least two tubular legs relative to said support base, wherein the rotational angle limit of each one of said at least two legs is individually adjustable;
    an object support insert including an object insert pin and an accessory retention device, said object insert pin being sized to be received by said pin bore, a spring loaded detent ball extending radially from an end of said object insert pin, said ball detent being positioned on said object insert pin to contact a bottom of said support boss; and
    a retention pin being retained in said support base, a retention groove is formed on an object insert pin of an object support insert, said retention pin includes a release groove, said retention pin being normally biased to engage said retention groove and retain the object support in said pin bore, wherein said object insert pin is depressed to align said release groove
with said object insert pin to allow the disengagement of said object insert pin from the object support, thus making the object support removable from said support base.

2. The object support of claim 1, further comprising:
    said support base including an insert boss and at least two leg yokes extending from a bottom of said support base, said at least two legs being pivotally retained by said at least two leg yokes.

3. The object support of claim 1, further comprising:
    each leg of said at least two legs including a retention projection and at least one tubular leg section, said retention projection being secured to one end of said at least one tubular leg section.

* * * * *